L. E. WHITON.
SCROLL CHUCK.
APPLICATION FILED JUNE 2, 1905.

962,070.

Patented June 21, 1910.

2 SHEETS—SHEET 1.

Witnesses
Chas. A. Pard
Rob S Allyn

Inventor
Lucius E. Whiton
By his Attorneys

L. E. WHITON.
SCROLL CHUCK.
APPLICATION FILED JUNE 2, 1905.

962,070.

Patented June 21, 1910.
2 SHEETS—SHEET 2.

Witnesses
Chas. A. Beard
R. H. S. Allyn

Inventor
Lucius E. Whiton
By his Attorneys

UNITED STATES PATENT OFFICE.

LUCIUS E. WHITON, OF NEW LONDON, CONNECTICUT.

SCROLL-CHUCK.

962,070.  Specification of Letters Patent.  Patented June 21, 1910.

Application filed June 2, 1905. Serial No. 263,419.

*To all whom it may concern:*

Be it known that I, LUCIUS E. WHITON, a citizen of the United States, residing at New London, county of New London, State of Connecticut, have invented certain new and useful Improvements in Scroll-Chucks, of which the following is a full, clear, and exact description.

My invention relates to improvements in lathe attachments, and particularly to a scroll chuck for what are termed "triple geared lathes". The chuck is mounted on a spindle or face plate, but driven from its rim.

The object of the invention is to provide a chuck of such character having a minimum of weight and overhang, but simple, of great strength, easily assembled or taken apart, and interchangeable for different types of jaws. Such improvements are found advantageous because of the low cost of manufacture, the facility for renewal of parts, the increase in available length of the lathe bed, the decrease in time of starting and stopping, and consequent saving of power.

The invention consists in improvements, the principles of which are illustrated in the accompanying two sheets of drawings. Briefly, it may be said to comprise a chuck body having the usual guides or guide-ways for the jaws, a scroll plate mounted within the body for adjusting the jaws, a ring carrying a pinion or pinions for rotation of the scroll and the gear, with bolts for clamping the chuck body to the gear, holding the pinion-carrying ring in place, and securing the chuck body, ring and gear together as a single element. The gear itself is provided with means for attachment to the spindle or face plate. It is obvious, however, from the specification and claims, that I do not limit myself to the details herein, but contemplate that many changes in construction may be made without departing from the spirit and scope of my invention.

Figure 1:
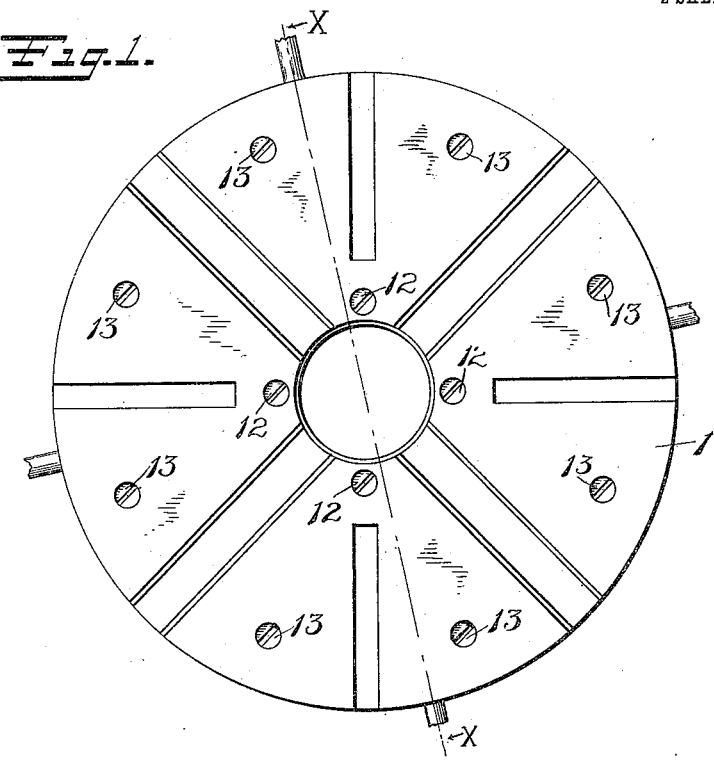
Figure 2:
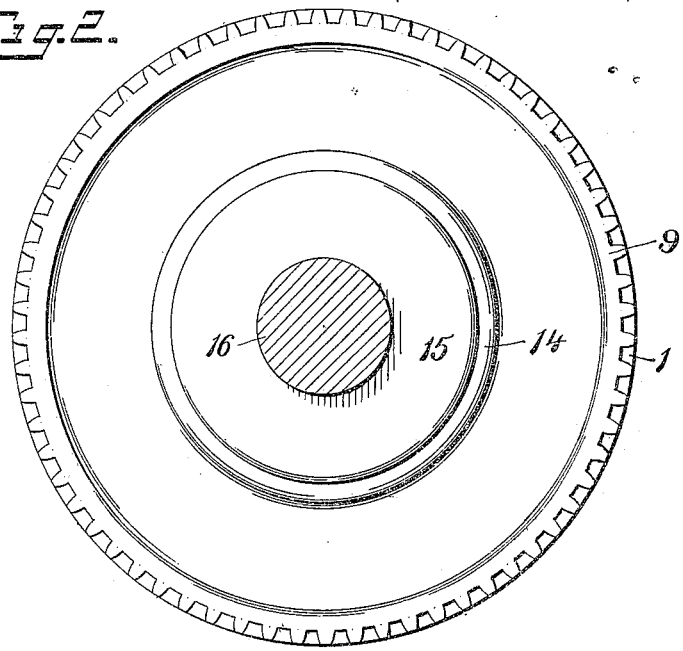
Figure 3:
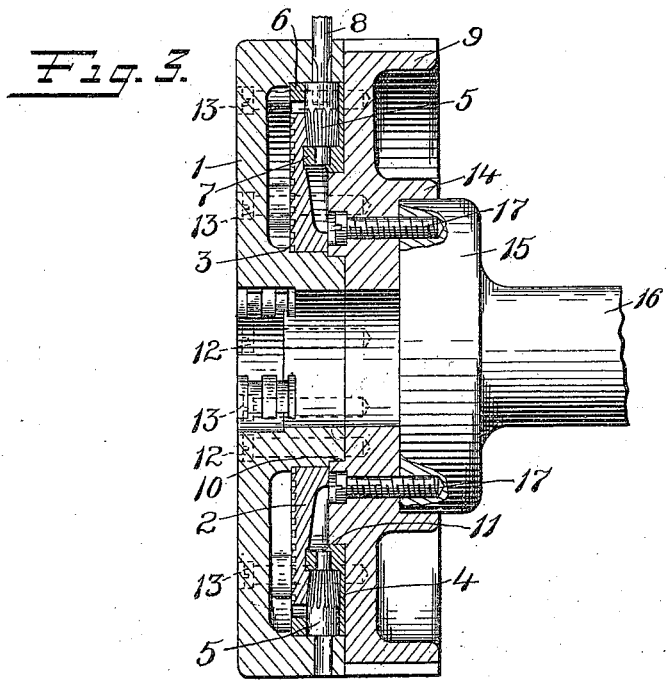
Figure 4:
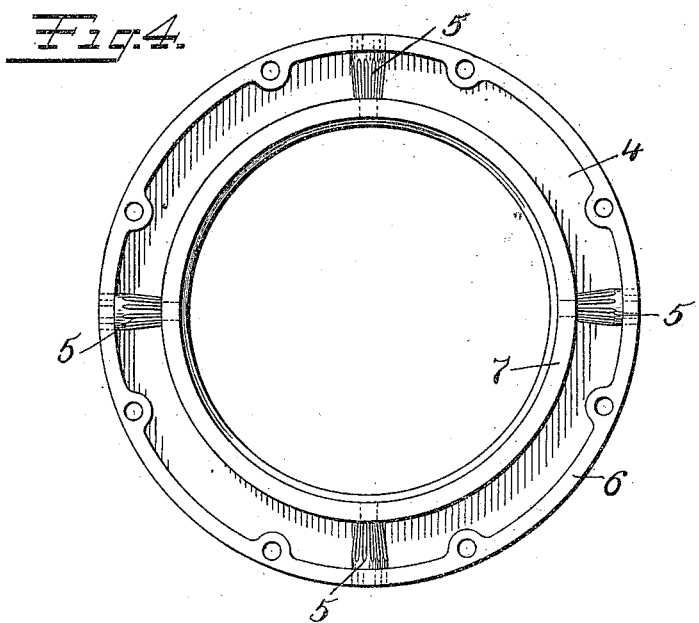

Figure 1 is a front view of a chuck embodying the improvements of my invention. Fig. 2 is a rear view showing it as attached to a face plate, with the spindle shown in cross section. Fig. 3 is a section of the chuck on the plane of the line X—X Fig. 1, showing it as attached to a spindle. Fig. 4 is a front view of the pinion-carrying ring.

1 is the chuck body recessed at the rear and provided in its face with suitable guides for the jaws.

2 is the scroll member mounted in back of the chuck body on its hub and against a shoulder 3.

4 is a ring carrying a series of bevel pinions 5 for meshing with the bevel gear teeth on the back of the scroll, as is customary.

6 is a flange carried by the ring 4, and affording a bearing for it within the rim of the chuck body. 7 is another flange formed with the ring member and bearing against the back of the scroll member. The pinions 5 are mounted in the flanges 6 and 7 and provided with axially arranged prismatic recesses for the reception of an adjusting or operating handle or key 8, which is adapted to be inserted through the rim of the chuck body.

9 is a driving member provided with peripherally arranged teeth through which the chuck is driven. This is mounted on the shoulder 10 of the hub of the chuck body, and also bears against the rim of the chuck body. The parts are so dimensioned that when assembled as shown in Fig. 3 the driving member acts as a backing for the ring 4, the ring being mounted on a shoulder 11 of the driving member.

12—12—12—12 are bolts provided for clamping the driving member and chuck body together around the hub.

13—13—13—13—13—13—13—13 are bolts for clamping the chuck body and driving member together around the rim. These bolts 13 pass through drilled holes in the ring 4 and prevent the ring from rotation when the pinions 5 are being operated. The parts are so proportioned that when assembled, the hub of the scroll is positioned between the chuck body and the driving member, so that there is no loose play between any of the parts, other than is necessary for the proper relative movement during adjustment.

14 is a flange extending from the body of the gear 9 forming a recess in the rear thereof, which is adapted to receive the face plate 15 of the lathe spindle 16.

17—17 are clamping screws or bolts for securing the driving member to the face plate.

The parts may be constructed of any suitable material and all bearing surfaces properly finished. It will be noted that when the chuck body is removed from the driving member, the pinion-carrying ring 4 and scroll member 2 are free to be removed.

When the parts are assembled in operation, power is transmitted through the driving member 9 directly to the chuck body, so that no strain, other than that of the longitudinal pressure of the scroll, is brought to bear upon the pinion-carrying ring.

The advantages of this construction will be apparent to those who are skilled in this art.

What I claim is:

1. In a scroll chuck, the combination of a chuck body having a hub, a scroll member mounted in a recess at the rear thereof, a pinion-carrying ring mounted wholly within said chuck body, a driving member in contact with the inner face of the hub, a series of bolts passing entirely through the ring for clamping said chuck body and ring to said driving member, and a series of bolts arranged around the axis of said chuck inside the scroll member for clamping said chuck body directly to the driving member.

2. In a scroll chuck, the combination of a chuck body having an annular recess forming a hub, a scroll member mounted in said recess, a pinion-carrying ring mounted within said chuck body, a driving member abutting against the hub of said chuck body and against the rim, and means for clamping said body and driving member together.

3. In a scroll chuck, the combination of a chuck body, a scroll member, a separate pinion-carrying ring mounted wholly within said chuck body, a driving member and means for clamping said chuck body, ring and driving member together, said driving member having a cylindrical projection upon its front end adapted to engage the inner cylindrical surface of said pinion-carrying ring.

4. In a scroll chuck, the combination of a chuck body, a scroll member, a separate pinion-carrying ring mounted wholly within said chuck body, a driving member, and means for clamping said chuck body, ring, and driving member together, said driving member having an annular projection upon its front end adapted to engage the inner cylindrical surface of said pinion-carrying ring and the outer cylindrical surface of the hub of said chuck body.

5. In a scroll chuck, a body having a rim and a hub with the shoulder 10, a driving member resting against said rim and having a recess centered on said shoulder and having a shoulder 11, a scroll member mounted on the hub of the body and abutting against a portion of the driving member, a pinion-carrying ring centered on the driving member shoulder and forming an abutment for the scroll and having a flange 6 bearing within the rim of the chuck body, and means for removably securing the parts together.

6. In a scroll chuck, a body having a rim and a hub with a shoulder 10, a driving member having a hub with a recess centered on shoulder 10 and having a shoulder 11, a scroll centered on the body hub and abutting against the driving member, a separate pinion-carrying ring centered on the driving member shoulder and having a flange 6 fitting within the rim of the body, a series of bolts directly connecting the body and driving member together at the hub, and a second series of bolts passing through the pinion-carrying ring and securing the body and pinion-carrying ring to the driving member.

7. In a scroll chuck, the combination of a chuck body, a scroll member, a driving member, a separate pinion-carrying ring carried by said chuck body and mounted between said scroll and driving member, and bolts passing through said ring for clamping said chuck body and ring to said driving member.

LUCIUS E. WHITON.

Witnesses:
 MEILE J. CHANDLER,
 ELIZABETH F. BROWN.